United States Patent [19]
Bender et al.

[11] Patent Number: 5,412,574
[45] Date of Patent: May 2, 1995

[54] METHOD OF ATTITUDE DETERMINATION USING EARTH AND STAR SENSORS

[75] Inventors: Douglas J. Bender; Thomas R. Parks, both of Redondo Beach; Thomas F. Brozenec, El Segundo, all of Calif.

[73] Assignee: Hughes Aircraft Company, Los Angeles, Calif.

[21] Appl. No.: 61,095

[22] Filed: May 14, 1993

[51] Int. Cl.[6] .......................... G06F 15/50; B64G 1/24
[52] U.S. Cl. ..................................... 364/455; 364/459; 244/164
[58] Field of Search ................ 364/455, 459; 244/164, 244/171; 250/206.2; 356/141, 142, 143, 152

[56]  References Cited
U.S. PATENT DOCUMENTS

| | | | |
|---|---|---|---|
| 4,658,361 | 4/1987 | Kosaka et al. | 364/434 |
| 4,680,718 | 7/1987 | Sasaki et al. | 364/455 |
| 4,944,587 | 7/1990 | Harigae | 356/152 |
| 5,054,719 | 10/1991 | Maute | 244/164 |
| 5,107,434 | 4/1992 | Paluszek | 364/455 |
| 5,107,434 | 4/1992 | Paluszek | 364/455 |
| 5,109,346 | 4/1992 | Wertz | 364/459 |
| 5,177,686 | 1/1993 | Böinghoff et al. | 364/459 |
| 5,189,295 | 2/1993 | Faibel | 250/206.2 |
| 5,259,577 | 11/1993 | Achkar et al. | 244/164 |

OTHER PUBLICATIONS

Guidance & Control, 1985; Proc 8th Annual Rocky Mountain Conference, *Design and Performance of a Satellite Laser Communications Pointing System* by Robert B. Deadrick.
SPIE vol. 295 Control and Communication Technology in Laser Systems, 1981, *Acquisition and Tracking System for a Ground-Based Laser Communications Receiver Terminal* by Ernest S. Clarke, Harley D. Brixey.
SPIE vol. 641 Acquisition, Tracking and Pointing, 1986, *Attitude Acquisition and Tracking Capabilities of the Instrument Pointing System* by Jens A. Busing, Fred Urban.
SPIE vol. 887 Acquisition, Tracking and Pointing II, 1988, *Azimuth/Elevation Servo Design of the W. M. Keck Telescope* by Mark J. Sirota, Peter M. Thomson.
SPIE vol. 1111, Acquisition, Tracking and Pointing III, 1989, *The Enhancement of Armored Vehicle Fire Control (Stationary and Fire-On-The-Move) Performance Using Modern Control Techniques* by John N. Groff.
SPIE vol. 1304, Acquisition, Tracking and Pointing IV, 1990, *A Low-Cost Alternative to Gyroscopes for Tracking System Stabilization* by Darren R. Laughlin, Mark A. Hawes, John P. Blackburn, Henry R. Sebesta.
SPIE vol. 1482, Acquisition, Tracking and Pointing V, 1991, *Deterministic Errors in Pointing and Tracking Systems II Identification and Correction of Dynamic Errors* by James Kimbrell, David Greenwald.
SPIE vol. 1482, Acquisition, Tracking and Pointing V, 1991, *A New Generation Control System for Ultra-Low Jitter Satellite Tracking* by William Verbanets, David Greenwald.
SPIE vol. 1482, Acquisition, Tracking and Pointing V, 1991, *Optimization of Gimbal Scanned Infrared Seeker* by Elmer Williams, Robert Evans, Karl Brant, Larry Stockrum.
SPIE, Acquisition, Tracking and Pointing VI, 1992, *Universal Beam Steering Mirror Design Using the Cross Blade Flexure* by Michael E. Meline, John P. Harrell, Kirk A. Lohnes.

*Primary Examiner*—Kevin J. Teska
*Assistant Examiner*—Tan Ngu Yen
*Attorney, Agent, or Firm*—Terje Gudemstad; Wanda K. Denson-Low

[57]  ABSTRACT

A method of attitude measurement for an artificial satellite (100) utilizes one or more star trackers (12) together with an earth sensor (30). Periodic updates of satellite orbital information, either propagated onboard or from a ground station are combined with earth and star position coordinate data to provide a continuous and accurate measurement of the spacecraft body 3-axis attitude. The method can be used for ground-based attitude determination or onboard closed loop control systems.

31 Claims, 4 Drawing Sheets

METHOD OF ATTITUDE DETERMINATION USING EARTH AND STAR SENSORS

BACKGROUND OF THE INVENTION

1. Field Of the Invention

The present invention broadly relates to determining and controlling spacecraft 3-axis attitude.

2. Description of the Prior Art

Artificial satellites and other spacecraft are in widespread use for various purposes including scientific research and communications. Many scientific and communications missions cannot be accurately fulfilled without consistently monitoring and controlling the spacecraft 3-axis attitude. In many applications the satellite must be positioned to direct communication signals in particular directions or to receive signals from specifically located sources. Without accurate control over spacecraft 3-axis attitude, the transmission of such signals is hindered and at times impossible.

Most modern spacecraft have 3-axis attitude control apparatus and methods included; however, these have several drawbacks or shortcomings. One method includes an earth sensor for two axes (i.e. roll and pitch) and continuous gyros with periodic sun sensor updates for the third axis (i.e. yaw). This technology is heavy, expensive, requires high power and is unreliable for long-life missions on the order of 10 to 15 years.

Alternative methods include those disclosed in U.S. Pat. No. 5,054,719 issued to P. A. Alexandre Maute, Oct. 8, 1991, and U.S. Pat. No. 5,107,434 issued to Michael A. Paluszek, Apr. 21, 1992. In each of these two patents, polaris star sensors and earth or sun sensors are used. These two configurations have several limitations and drawbacks. First, polaris star sensors must be oriented northward toward the inertial polar axis. In the case of 3-axis stabilized geosynchronous satellites, accurate polaris sensing with constant northward orientation is problematic since solar panels will cause glint in the polaris star sensor's field of vision. Therefore, either extremely long sunshades and/or long mounting booms are required to ensure proper sensing of the desired polar star. Sunshades or mounting booms add additional weight to a spacecraft which, obviously, is undesirable. Further, when a star tracker is boom-mounted, essentially uncalibratable flexible vibration and distortions of the boom greatly reduce the accuracy of the system. Finally, systems utilizing polaris star sensors can only be used in low inclination orbits. Continuously directing a polaris star sensor towards a polar star in a high inclination orbit is difficult because a mounting location may not be found to provide continuous northward orientation of the sensor.

A third known method used to control 3-axis attitude includes using general purpose star sensors alone. At least two star sensors are required for this method and typically at least 3 are used for redundancy. The additional star sensor in this instance imposes additional weight, power, cost and mounting space requirements on the spacecraft system. One star tracker can track multiple stars and estimate 3-axis attitude measurements by itself; however, its accuracy is a function of star separation within its field of vision. Reasonable accuracy requires a minimum star separation. The required value of star separation within the field of vision is not always guaranteed. In order to guarantee accuracy using only general purpose star sensors requires at least two operational star sensors activated at the same time.

The inventive method is an improvement over the prior art because it avoids many of the difficulties inherent in determining and controlling 3-axis attitude using polaris star sensors or general purpose star sensors alone. The inventive method employs a general purpose star tracker and a terrestrial body sensor to provide continuous and accurate 3-axis attitude estimation and control.

SUMMARY OF THE INVENTION

The method of the present invention determines the attitude of a spacecraft in a preselected orbit by using a star tracker, a terrestrial sensor and periodic updates of spacecraft orbit information. The method of the present invention includes six basic steps. First, measure the position of the earth relative to the spacecraft using the terrestrial body sensor. Second, determine a set of coordinate data that defines the position of the earth relative to the spacecraft orbit. Third, measure the positions of a plurality of stars within the star tracker's field of vision relative to the star tracker. Fourth, determine a set of coordinate data that defines the positions of the stars within the star tracker's field of vision relative to the spacecraft. Fifth, determine a set of coordinate data that defines the positions of the same stars relative to the spacecraft orbit. Lastly, determine the spacecraft 3-axis attitude using the measured position of the earth and the several sets of coordinate data that define: the position of the earth relative to the spacecraft orbit, the position of the earth relative to the spacecraft, the positions of the stars relative to the spacecraft, and the positions of the stars relative to the spacecraft orbit, respectively.

The method of the present invention provides a continuous and accurate estimate of spacecraft 3-axis attitude using a combination of star and earth position measurements with periodic updates of spacecraft orbit information. One or more general purpose star trackers are used together with any sensor that will provide measurements of earth position.

General purpose star trackers employed in connection with the present invention must be capable of star acquisition, tracking and identification in any part of the sky. The star sensors image light from stars onto a detector, discriminate between stars and other detected light, determine what stars to track and identify those stars using an onboard star catalog. Star positions are reported in sensor referenced and inertially referenced coordinates. Star data from the trackers is combined with earth position measurements taken from the earth position sensor. The earth position sensor can be a carbon dioxide band type earth sensor or a ground based RF beacon type sensor. The reference coordinates of the star data and the earth position in combination with orbit information periodically updated from the ground provide the necessary information to determine the spacecraft 3-axis attitude.

These and other features and objects of the present invention will be seen in the following specification and claims in conjunction with appended drawings, of which the following is a brief description.

DETAILED DESCRIPTION OF A PREFERRED EMBODIMENT

Figure 1A:
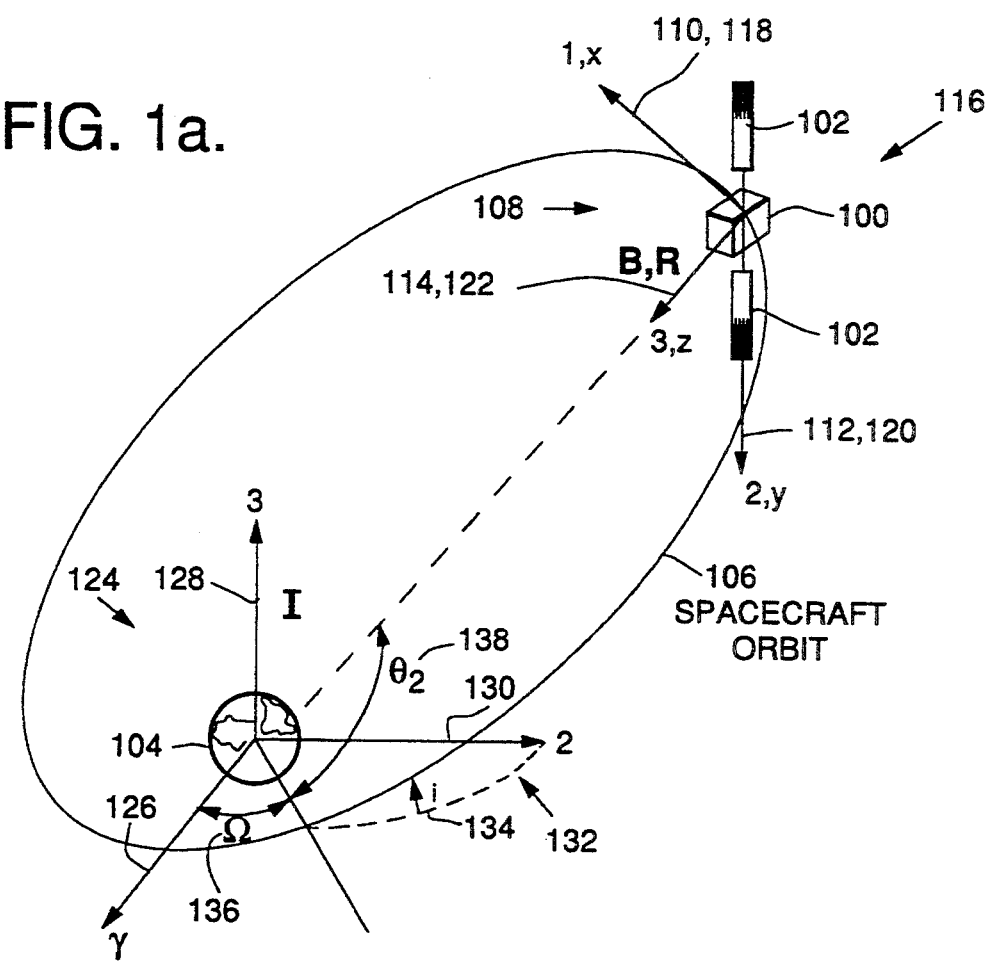
FIG. 1(a) is a perspective view of a satellite orbiting the earth showing three reference frames associated with the present invention.

FIG. 1(a) is a perspective view of a satellite orbiting the earth showing three of the essential reference frames associated with the method of the present invention. Satellite 100 with solar panels 102 is orbiting the earth 104 along orbit path 106. The two sets of axes having their origins in the satellite 100 and the center of the earth 104, respectively, depict the various reference frames.

The spacecraft body frame (B) 108 has its origin at the center of the satellite 100. The x-axis 110 is the roll axis. The y-axis 112 is the satellite pitch axis. The z-axis 114 is the satellite yaw axis, that is pointed toward earth nadir.

The spacecraft orbit frame or reference frame (R) 116 is nominally coincident with spacecraft body frame 108. Reference frame 116 has its 1-axis 118 coincident with the body frame x-axis 110. Reference frame 116 has its 2-axis 120 coincident with body frame y-axis 112. 3-axis 122 is coincident with z-axis 114. Although reference frame 116 is illustrated coincident with spacecraft body frame 108, these two frames of reference will not always be aligned.

Celestial frame (I) 124 is commonly known as the earth centered inertial frame. Celestial frame 124 has its 1-axis 126 pointing in the direction of the vernal equinox of the earth. Celestial frame 124 has its 3-axis 128 pointing north along the rotation axis of the earth 104. The celestial frame 124 2-axis 130 lies in the equatorial plane 132 of earth 104 and properly completes the right-handed triad.

The relationship between celestial frame 124 and the spacecraft orbit or reference frame 116 is described by three variables: the orbit inclination, i, 134, illustrated as measured in the equatorial plane; the right ascension of the ascending node, $\Omega$ 136 illustrated as measured in the equatorial plane; and the time of day angle, $\theta_2$, 138 which varies linearly from zero to 360 degrees through a single day as measured in the equatorial plane.

FIG. 1 (b) illustrates the fourth reference frame associated with the method of the present invention. Star tracker reference frame (S) 140 is illustrated relative to the spacecraft body frame 108. The a, b, and c axes 142, 144, and 146, respectively, represent the star tracker frame 140. The star tracker frame's axes are related to the x 110, y 112, and z 114 axes of the spacecraft body frame 108 as illustrated. To achieve the illustrated orientation, begin with a, b, c coincident with x, y, z. The star sensor boresight is along c. Rotate the tracker frame about the b-axis through $\alpha_{AZ}$ degrees, where $\alpha_{AZ}$ is the tracker azimuth mounting angle, described more fully below in relation to FIG. 3(a). Next, rotate about the a-axis through $\epsilon_{EL}$ degrees where $\epsilon_{EL}$ is the tracker elevation mounting angle, described more fully below in relation to FIG. 3(b). Finally, rotate about the c-axis by $\gamma_R$, the rotation mounting angle of the star tracker.

Figure 2:
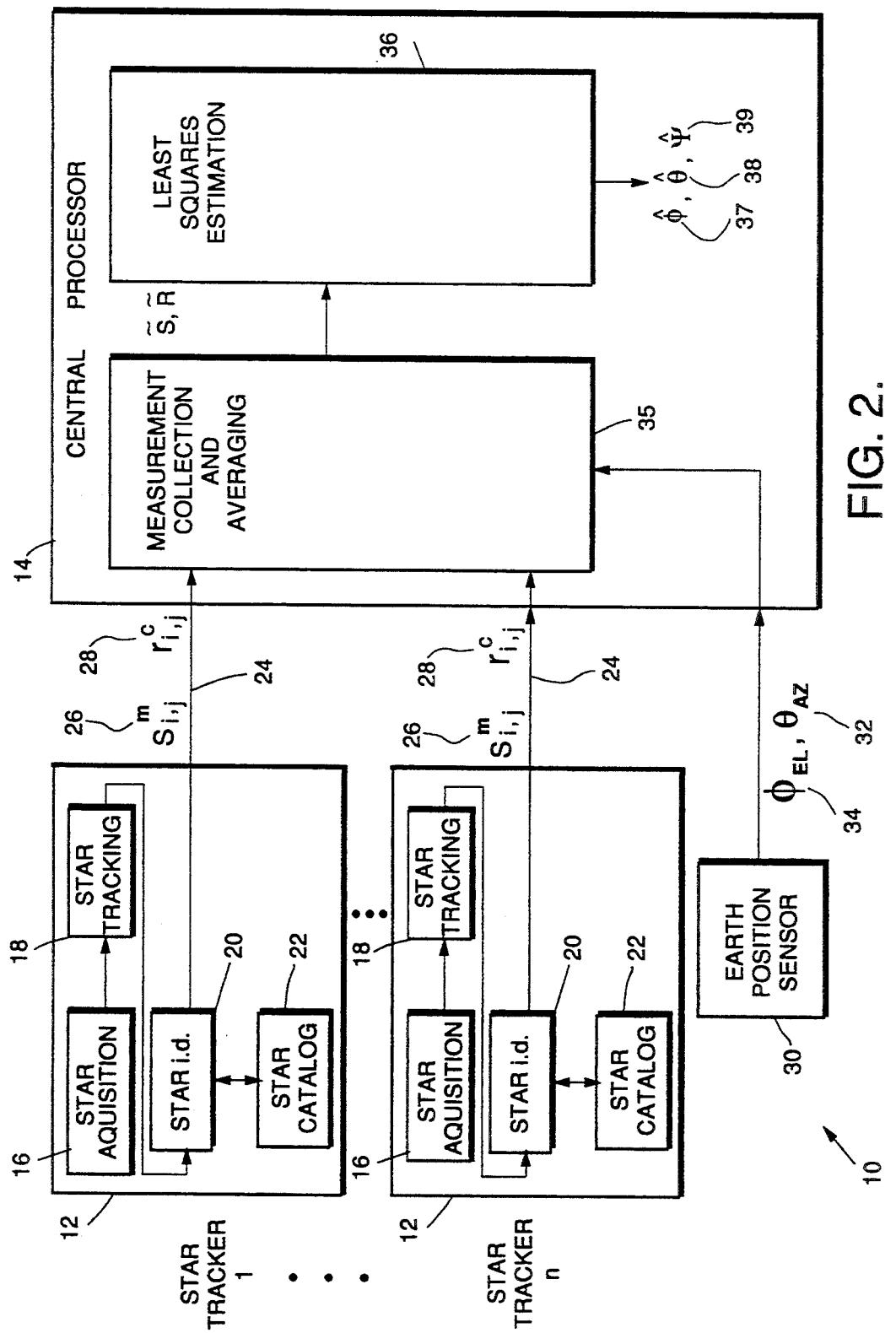
FIG. 2 is a block diagram showing essential components to practice the inventive method.

FIG. 2 is a block diagram of a control system 10 for determining the 3-axis attitude of an earth orbiting satellite (not shown) along three axes, in accordance with the present invention. A plurality of star trackers 12 are linked to a central processing unit (CPU) 14. In actual implementation of the illustrated embodiment, this link may be through hardware such as hardwiring if CPU 14 is on-board the satellite, or linked in the sense that the star trackers 12 communicate with the CPU 14 through radio or microwave signals. Star trackers 12 acquire tracking information regarding stars within their field of vision from star acquisition means 16. The light from the stars is detected on a star detector (not shown). The detected or imaged light is then filtered to eliminate light sources other than stars. Star tracking means 18 then determines which stars to track. The illustrated embodiment further includes a star identifying means 20 of the type having the capability of internally identifying tracked stars through an onboard star catalog 22. Star identifying means 20 compare the input from tracking means 18 with onboard star catalog 22. The information gathered and processed by star trackers 12 is converted into digitized form by a digitizer 23 and then transferred to CPU 14.

The star trackers 12 employed in connection with the method of the present invention must have the ability to detect visible light and convert it to digitized electronic charge information. The star trackers 12 must also be able to acquire one or more stars while avoiding false image acquisition, track and centroid one or more stars subsequent to acquisition and identify the tracked stars using the onboard star catalog 22. The illustrated star trackers 12 have these capabilities internally, however, these functions can be equally well performed by a conventional separate digital processor (not shown).

Star tracker 12 has an output 24 that consists of averaged and normalized vector measurements 26, 28 of the positions of the identified stars relative to the spacecraft body and an orbit reference frame, respectively. The details of how these measurements are obtained is described more fully below.

An earth position sensor 30 is also connected to the CPU 14. Earth position sensor 30 can be any conventional sensor that measures earth position to facilitate an estimate of the attitude of the satellite along the 3-axes. Examples of such earth position sensors include a carbon dioxide band earth sensor or an RF ground beacon sensor. The earth position sensor 30 acquires and provides information regarding azimuth 32 and elevation 34 measurements of earth nadir or a preselected ground station. The nadir measurements will be necessary when a carbon dioxide band sensor is employed. When an RF ground beacon sensor is employed, the azimuth and elevation measurements will define a ground station having a known longitude and latitude.

Earth sensor 30 could be replaced with a cross-link sensor. A cross-link sensor would measure the position of a preselected artificial satellite or spacecraft relative to the cross-link sensor. One example of such a cross-link sensor would be an autotrack sensor that is an RF receiver that uses an RF beacon source. If a cross-link sensor is employed, terrestrial body position measurements would be replaced by preselected beacon measurements, accordingly. The remainder of this discussion assumes an earth sensor 30 is employed.

CPU 14 collects averaged measurements 26, 28 from star trackers 12 and measurements 32, 34 from earth sensor 30, and processes them according to the inventive method described in detail below. The averaged values, S, R, are used to approximate the values of the necessary attitude determining variables; namely, the satellite body roll, pitch and yaw $\phi 37$, $\theta 38$, $\Psi 39$.

A satellite steering law is chosen and the earth position sensor 30 is mounted on the satellite body 100 such that it is oriented toward the earth 104 continuously throughout the satellite's orbit 106. The star tracker dynamic range is chosen and the star tracker 12 is mounted on the satellite body 100 to meet several requirements. For example, the earth position sensor boresight and the star tracker boresight must have good angular separation between them. The amount of angular separation required will depend on attitude determination accuracy requirements since the accuracy potential of any geometric configuration can be expressed as a function of boresight angular separation. Optimal accuracy is achieved with 90 degree angular separation. Worst case scenario accuracy results when angular separation is zero degrees. Acceptable accuracy is generally attained with angular separation of at least 30 degrees.

A minimum angular separation of at least 25 degrees must be maintained between the star tracker boresight and any light sources such as the moon or spacecraft appendages that may cause glint, to avoid "flooding" the star tracker detector with light. Examples of such appendages include antennas and solar panels.

The star tracker 12 should be oriented on the satellite body such that the sun or moon will never enter the star tracker field of vision. This can be accomplished by taking into consideration the satellite orbit and star tracker sunshade design.

The star tracker dynamic range and mounting orientation should provide at least one measurable star in the field of vision continuously at each point in the orbit 106. This can be achieved given the satellite orbit 106.

Figure 3A:
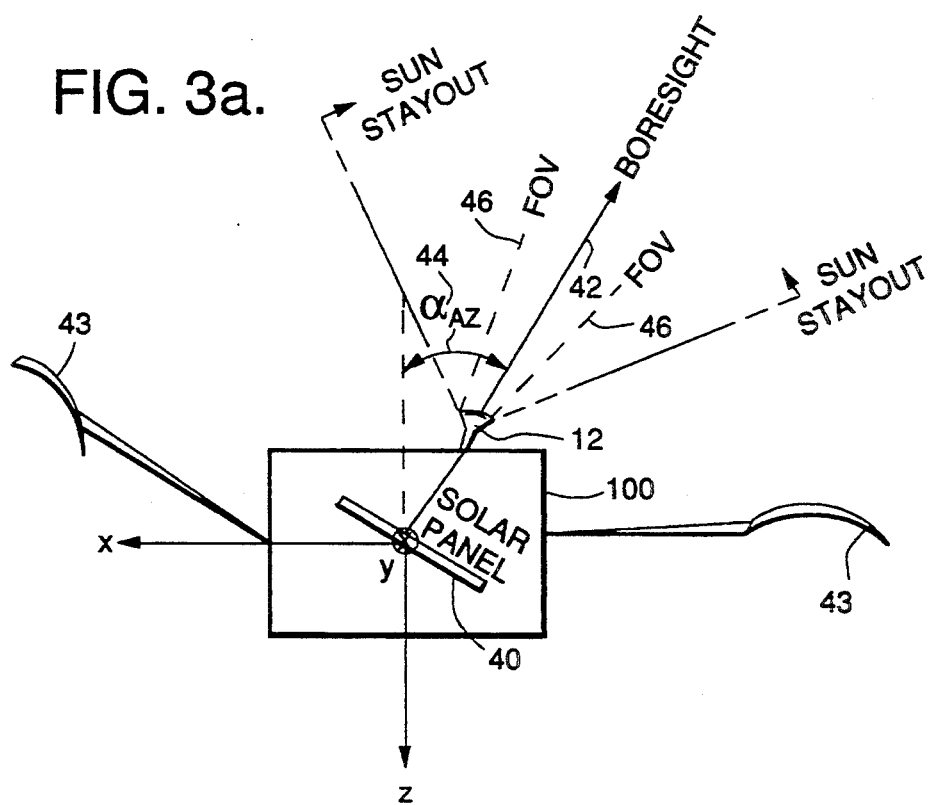
FIGS. 3(a) and 3(b) illustrate proper star tracker boresight orientation relative to satellite appendages.
Figure 3B:
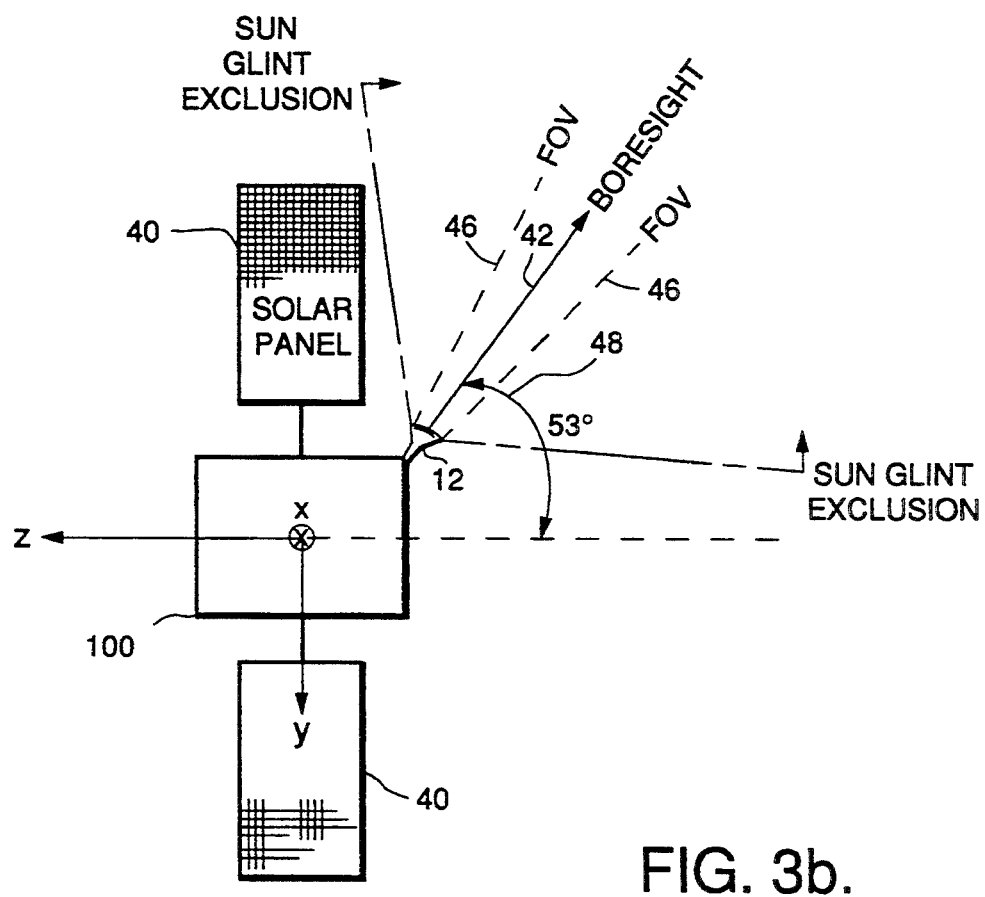

FIGS. 3(a) and 3(b) illustrate one mounting configuration for the star tracker 12 that is appropriate for a geosynchronous communications satellite 100 with an earth nadir-pointing orbit-normal steering law in a zero inclination equatorial orbit. In FIG. 3(a) the essentially flat surfaces of two solar panels 40 are in the y-z plane. In FIG. 3(a), the y-axis would point downwards, normal into the surface of the paper. Solar panels 40, respectively extend outwardly from the north and south faces of the spacecraft body 100. Two large steerable antennas 43 extend nominally from the east and west faces of the spacecraft body 100, respectively. Antennas 43 have a range of motion in both azimuth and elevation directions. Star tracker boresight 42 has an azimuth mounting angle 44, $\alpha_{AZ}$, relative to the negative z-axis, also known as the negative yaw axis in the roll-yaw plane.

Azimuth angle, $\alpha_{AZ}$ yields optimum accuracy at 90 degrees. However, spacecraft appendage stay-out zone requirements may not always permit an $\alpha_{AZ}$ orientation of 90 degrees. The illustrated spacecraft configuration includes a 25 degree stayout zone for spacecraft appendages. Therefore, optimal star tracker mounting includes $\alpha_{AZ}$ being as near 90 degrees as possible while providing 25 degrees clearance between all spacecraft appendages and the star tracker boresight 42.

FIG. 3(b) illustrates the same satellite 100 with star tracker 12 and solar panels 40 as viewed in the y-z plane also known as the pitch-yaw plane. Elevation angle 46, $\epsilon_{EL}$, equals 53 degrees up from the roll-yaw plane. $\epsilon_{EL}$ is 53 degrees because the illustrated configuration includes a maximum sun declination equal to 23 degrees and a sun stayout requirement equal to 30 degrees. $\epsilon_{EL}$ is the sum of the sun declination and the sun stayout requirement. The sun stayout requirement is a function of the star tracker's sunshade design.

The illustrated configuration ensures that the sunline will never encroach a line extended at 30 degrees from star tracker boresight 42. Some angular separation also exists between the north solar panel 40 and star tracker boresight 42, thereby avoiding glint.

FIG. 3(b), in conjunction with 3(a), therefore, illustrates one mounting configuration that enables star tracker 12 to have a field of vision 46 that will not encompass sunlight or glint from solar panels 40 or antennas 43.

Figure 4:
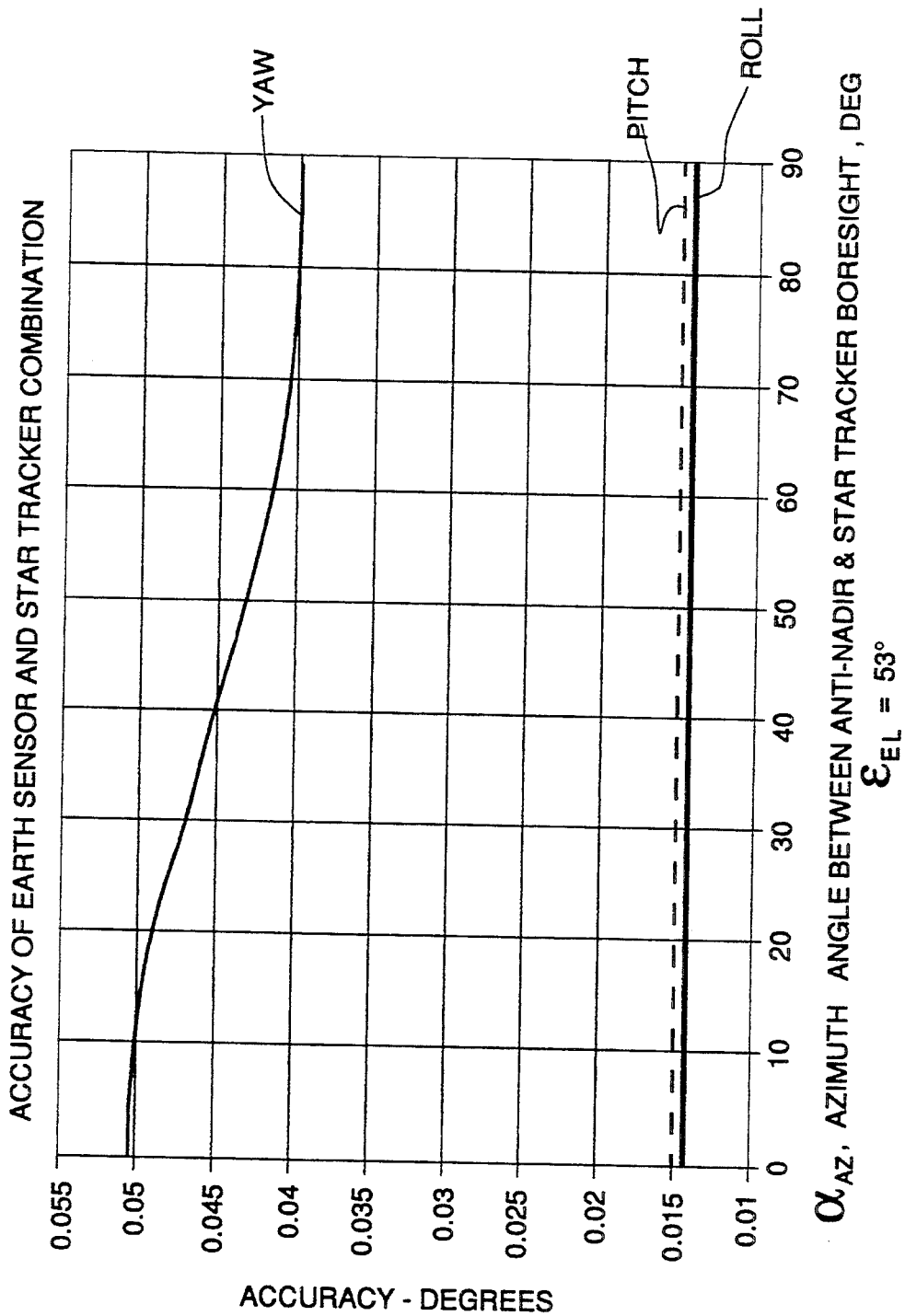
FIG. 4 is a plot of expected star tracker accuracy versus star tracker mounting position as illustrated in FIGS. 3(a) and 3(b).

FIG. 4 is a plot of expected accuracy relative to star tracker mounting position for the star tracker 12 mounting configuration illustrated in FIGS. 3(a) and 3(b). The actual location of the star trackers 12 on the satellite body 100 is unimportant to the accuracy calculation; only the orientation of the field of vision 46 is relevant. $\epsilon_{EL}$ is equal to 53 degrees. FIG. 4 shows that as $\alpha_{AZ}$ varies from zero to 90 degrees, the error of the star sensor and earth sensor combination correspondingly decreases from approximately 0.05 degrees to 0.04 degrees. Therefore, optimum accuracy is achieved with $\alpha_{AZ}$ equal to 90 degrees as discussed in relation to FIG. 2(a) above.

The operation of the control system described above, and the method of the present invention will now be described.

The star trackers 12 identify stars and provide vector measurement information regarding those stars in two separate coordinate frames of reference. The coordinate frames of reference are a sensor frame and an inertially fixed frame, both described in detail below. The vector measurement information is provided at the sensor update rate that can be selected according to satellite mission requirements.

The earth position sensor 30 provides a vector measurement of earth nadir in the satellite body frame of reference 108. Earth position sensor 30 also generates a vector measurement of the same earth position relative to the spacecraft orbit 106 using an ephemeral data base. The earth and star measurements in the two reference frames are equated through a variable attitude matrix providing the equations, in the appropriate unknowns, to determine the satellite 3-axis attitude.

The inventive method employed by the present control system depends on mathematical manipulation of star and earth position vector measurements. These measurements are achieved In the specific coordinate reference frames, illustrated in FIGS. 1(a) and 1(b), and are transformed from one frame to another. The reference frames utilized in the inventive method are a Star Tracker Frame 140, a Spacecraft Body Frame 108, an Orbiting Reference Frame 116 and a Celestial Frame 124.

Figure 1B:
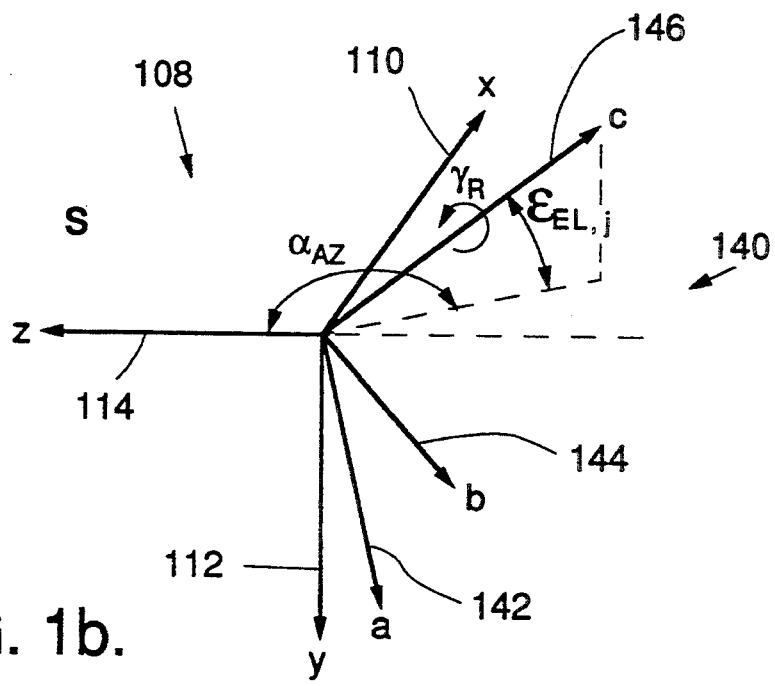
FIG. 1(b) illustrates the relationship between a star tracker reference frame and the spacecraft body frame.

FIGS. 1(a) and 1(b) illustrate one embodiment containing each of these reference frames.

The following description of the inventive method includes the notation A: $A(\alpha_1, \ldots, \alpha_m)$ to describe a direction cosine matrix where arguments $\alpha_i$ (i, ranging from 1 to m) indicate a functional dependence of the direction cosine matrix on the arguments. The various direction cosine matrices described below are used as transformations of the input coordinate data from one reference frame to another.

There are three preferred transformations involved in the inventive method. First, the transformation from spacecraft body (B) to star tracker (S) coordinates is defined as:

$$M_j: B \to S \quad M_j = M_j(\alpha_{AZ,j}, \epsilon_{EL,j}, \gamma_{R,j}) \quad \text{(Equation (1))}.$$

$$M_j = \begin{bmatrix} \cos\gamma_{R,j} & \sin\gamma_{R,j} & 0 \\ -\sin\gamma_{R,j} & \cos\gamma_{R,j} & 0 \\ 0 & 0 & 1 \end{bmatrix} \begin{bmatrix} 1 & 0 & 0 \\ 0 & \cos\epsilon_{EL,j} & \sin\epsilon_{EL,j} \\ 0 & -\sin\epsilon_{EL,j} & \cos\epsilon_{EL,j} \end{bmatrix} \begin{bmatrix} \cos\alpha_{AZ,j} & 0 & -\sin\alpha_{AZ,j} \\ 0 & 1 & 0 \\ \sin\alpha_{AZ,j} & 0 & \cos\alpha_{AZ,j} \end{bmatrix}$$

Where $\alpha_{AZ,j}$ is the azimuth mounting angle 44, $\epsilon_{EL,j}$ is the elevation mounting angle 46 and $\gamma_{R,j}$ is the rotation mounting angle of the jth star tracker with respect to the spacecraft.

The variable j represents a star tracker in the range from 1 to n. In one embodiment n=2. $M_j$ is constant for j=1, . . . n and, therefore can be stored on board the spacecraft and used in the calculations to be described below.

Second, the transformation from orbiting reference frame (R) 116 to spacecraft body frame (B) 108 is defined as:

$$A: R \to B \quad \text{(Equation (2))}.$$

$$A = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

Matrix A is the attitude matrix that describes the spacecraft attitude. Therefore, Matrix A is the solution matrix in the inventive method. Matrix A can be described in terms of Euler angles as:

$$A = \begin{bmatrix} c\psi c\theta & c\psi s\theta s\phi + s\psi c\phi & -c\psi s\theta c\phi + s\psi s\phi \\ -s\psi c\theta & -s\psi s\theta s\phi + c\psi c\phi & s\psi s\theta c\phi + c\psi s\phi \\ s\theta & -c\theta s\phi & c\theta c\phi \end{bmatrix} \quad \text{(Equation (3))}.$$

Where $\phi$37, $\theta$38, $\Psi$39, represent a 1-2-3 euler angles set; one of twelve possible Euler angle representations of A. Specifically, $\phi$ is the body roll pointing error, $\theta$ is the pitch pointing error and $\Psi$ is the yaw pointing error.

Matrix A can also be described in terms of quaternion elements as:

$$A = \begin{bmatrix} q_1^2 - q_2^2 - q_3^2 - q_4^2 & 2(q_1 q_2 + q_3 q_4) & 2(q_1 q_3 - q_2 q_4) \\ 2(q_1 q_2 - q_3 q_4) & -q_1^2 + q_2^2 - q_3^2 + q_4^2 & 2(q_2 q_3 + q_2 q_4) \\ 2(q_1 q_3 + q_2 q_4) & 2(q_2 q_3 - q_1 q_4) & -q_1^2 - q_2^2 + q_3^2 + q_4^2 \end{bmatrix}$$

Where q1, q2, q3 and q4 are the quaternion elements of the quaternion of rotation corresponding to Matrix A.

Defining the orbiting reference frame so that the attitude matrix represents a small rotation results in all twelve Euler angle representations, to first order, being equivalent. Therefore, when small angle assumptions are made, Matrix A can be written as:

$$A = \begin{bmatrix} 1 & \psi & -\theta \\ -\psi & 1 & \phi \\ \theta & -\phi & 1 \end{bmatrix} \quad \text{(Equation (4))}.$$

Small angle approximations are valid for most communications and science satellites. With the steering laws usually chosen for modern satellites, the satellite body axes will not deviate from the orbiting reference frame more than a few tenths of a degree during normal operations.

Third, the transformation from celestial frame (I) 124 to orbiting reference frame (R) 116 is defined as:

$$C: I \to R \quad C = C(i, \Omega, \theta_2) \quad \text{(Equation (5))}.$$

$$C = \begin{bmatrix} -\sin(\Omega)\cos(\iota)\sin(\theta_2) + \cos(\Omega)\cos(\theta_2) & \sin(\theta_2)\cos(\Omega)\cos(\iota) + \sin(\Omega)\cos(\theta_2) & \sin(\iota)\sin(\theta_2) \\ -\sin(\Omega)\cos(\iota)\cos(\theta_2) - \cos(\Omega)\sin(\theta_2) & \cos(\Omega)\cos(\iota)\cos(\theta_2) - \sin(\theta_2) & \sin(\iota)\cos(\theta_2) \\ \sin(\Omega)\sin(\iota) & -\cos(\Omega)\sin(\iota) & \cos(\iota) \end{bmatrix}$$

Where i is the orbit inclination, $\Omega$ is the right ascension of the ascending node 13. $\theta_2$ is the angle 138 proportional to the time of day. $\theta_2$ varies linearly from zero to 360 degrees in a single day for a geosynchronous satellite; in a single orbit for a non-geosynchronous circular orbit.

Transformation C: I→R is time-varying in all constituent arguments. The time of day angle varies as described above. Gravitational factors cause the orbit inclination 134 and right ascension of the ascending node 136 to change over periods on the order of days and weeks. Angle $\theta_2$ 138 should be updated onboard the spacecraft every few seconds to update transformation C. Similarly, orbital elements i and $\Omega$ should be updated to update transformation C. Orbital elements i and $\Omega$ can be updated on board the spacecraft or on the ground on the order of every few days or weeks. Properly updating the parameters of transformation C ensures an accurate representation of that transformation and, therefore, accurate calculation of the attitude matrix as described below.

Star trackers 12 and earth position sensor 30 provide three essential measurements used as input data. First, star trackers 12 provide star vector measurements 26 expressed in star tracker frame S. If k is the total number of star measurements from star tracker j and there are a total of n star trackers, the notation:

$$S_{ij}^m \in S \ (i = 1, \ldots, k) \ (j = 1, \ldots, n)$$

can describe the star vector input coordinates. Each $S_{ij}$ is a 3-vector describing the direction to that star measurement.

Second, the star vectors 28 will be expressed in the celestial coordinate frame I based on the information in star catalog 22 and the star identification data. These star vectors can be expressed using the notation:

$$r_{ij}^c \in I \ (i = 1, 2, \ldots, k) \ (j = 1, \ldots, n).$$

Where i, j, k, and n are the same as above.

Third, earth position sensor provides earth vector measurements in spacecraft body coordinates B as:

$$s_E = \begin{bmatrix} \cos(\theta_{EW}) & \sin(\theta_{NS})\sin(\theta_{EW}) & \cos(\theta_{NS})\sin(\theta_{EW}) \\ 0 & \cos(\theta_{NS}) & -\sin(\theta_{NS}) \\ -\sin(\theta_{EW}) & \sin(\theta_{NS})\cos(\theta_{EW}) & \cos(\theta_{NS})\cos(\theta_{EW}) \end{bmatrix} \begin{bmatrix} -\sin\theta_{AZ}\cos\phi_{EL} \\ \sin\phi_{EL} \\ \cos\theta_{AZ}\cos\phi_{EL} \end{bmatrix} \quad \text{(Equation (6))}.$$

Where, if the earth sensor 30 is an RF space-ground link, $\theta_{EW}$ is the azimuth and $\theta_{NS}$ is the elevation angle describing the position of a ground station with respect to earth nadir. $\theta_{AZ}$ 32 and $\phi_{EL}$ 34 are the space-ground link azimuth and elevation measurements with respect to the ground station respectively. If the earth sensor 30 is a carbon dioxide band sensor then, $\theta_{EW}$ and $\theta_{NS}$ are both equal to zero and $\theta_{AZ}$ and $\phi_{EL}$ are azimuth and elevation angle measurements of the earth sensor with respect to earth nadir. The proper earth ephemeris data is given by the following notation:

$$r_E^c = (0 \ 0 \ 1)^T \in R,$$

which is analogous to star reference positions given from the star catalog 22.

The above described input data is then processed to determine the satellite 3-axis attitude. One embodiment includes equating measurements in the body frame B to reference information in the orbiting reference frame R through the transformation between these frames; A($\phi$, $\theta$, $\Psi$), the desired attitude matrix.

Measurements from the earth position sensor that constitute measurement vector $s_E$ will be combined with k star measurements each from n star trackers. The star tracker vector measurements and corresponding references can be averaged and normalized in cartesian coordinates yielding one measurement vector and its corresponding reference from each star tracker. This is performed to limit data flow across the star tracker interface with the CPU. The normalized cartesian sum of the measurement and reference vectors is computed as:

$$S_{avg,j}^m = \frac{S_{1j}^m + S_{2j}^m + \ldots + S_{kj}^m}{\|S_{1j}^m + S_{2j}^m + \ldots + S_{kj}^m\|_2} \quad \text{(Equation (8))}.$$
$$j = 1, \ldots, n$$

$$r_{avg,j}^c = \frac{r_{1j}^c + r_{2j}^c + \ldots + r_{kj}^c}{\|r_{1j}^c + r_{2j}^c + \ldots + r_{kj}^c\|_2} \quad \text{(Equation (9))}.$$
$$j = 1, \ldots, n$$

where the denominator is the vector 2-norm.

Equating the averaged measurements and the averaged references through rotation A yields:

$$S_{avg,j} = M_j^T S_{avg,j}^m = A(\phi,\theta,\psi) C r_{avg,j}^c = A(\phi,\theta,\psi) R_{avg,j} \quad \text{(Equation (10))}.$$
$$j = 1, \ldots, n$$

$$S_E^m = A(\phi,\theta,\psi) r_c^c = A(\phi,\theta,\psi) \begin{bmatrix} 0 \\ 0 \\ 1 \end{bmatrix} \quad \text{(Equation (11))}.$$

Now, by substituting equation (4) into equations (10) and (11), rearranging terms and removing an extraneous equation yields:

$$\widetilde{S} = \begin{bmatrix} S_{avg,1}(1) - R_{avg,1}(1) \\ S_{avg,1}(2) - R_{avg,1}(2) \\ S_{avg,1}(3) - R_{avg,1}(3) \\ S_{avg,n}(1) - R_{avg,n}(1) \\ S_{avg,n}(2) - R_{avg,n}(2) \\ S_{avg,n}(3) - R_{avg,n}(3) \\ S_E^m(1) \\ S_E^m(2) \end{bmatrix} = \quad \text{(Equation (12))}.$$

$$\begin{bmatrix} 0 & -R_{avg,1}(3) & R_{avg,1}(2) \\ -R_{avg,1}(3) & 0 & -R_{avg,1}(2) \\ -R_{avg,1}(2) & -R_{avg,1}(1) & 0 \\ 0 & -R_{avg,n}(3) & R_{avg,n}(2) \\ -R_{avg,n}(3) & 0 & -R_{avg,n}(2) \\ -R_{avg,n}(2) & -R_{avg,n}(1) & 0 \\ 0 & -1 & 0 \\ 1 & 0 & 0 \end{bmatrix} \begin{bmatrix} \phi \\ \theta \\ \psi \end{bmatrix} = \widetilde{R} \begin{bmatrix} \phi \\ \theta \\ \psi \end{bmatrix}$$

This is a linear measurement equation expressed in terms of $\phi$, $\theta$ and $\Psi$. The notation $X_{avg,i}(j)$ denotes the jth element of the 3-vector $X_{avg,i}$. The least squares attitude estimate is then given by the equation:

$$\begin{bmatrix} \phi \\ \theta \\ \psi \end{bmatrix} = \left[ \widetilde{R}^T \widetilde{R} \right]^{-1} \widetilde{R}^T \widetilde{S} \quad \text{(Equation (13))}.$$

As discussed above, small angle approximations provide the simple form of the attitude matrix in equation (4) because such approximations are consistent with most steering laws employed by most communications and science satellites. In equations (8) and (9), the measurements of multiple stars from each star tracker and their corresponding references are averaged in cartesian coordinates providing one measurement from the star tracker, reducing subsequent computation and limiting data flow across the interface between the star trackers 12 and the CPU 14.

Equation (13) gives the least-squares solution to the linear system of equations in equation (12). Typically, the calculations in equation (13) are not performed directly; rather a QR decomposition or orthogonal triangularization of R is used. The QR decomposition is well known and, therefore, will not be described further. The QR decomposition is numerically stable and can be implemented as part of the inventive method due to the overall structure of the method.

Any alternate attitude determination scheme (QUEST, for example) can be utilized to derive estimates of the spacecraft attitude from the various measurements.

The preceding description is exemplary rather than limiting in nature. A preferred embodiment of the present invention has been described to enable one skilled in the art to practice the method of the present invention. Variations and modifications may be employed without departing from the purview and intent of the present invention; the scope of which is limited only by the appended claims.

What is claimed is:

1. A system for determining the 3-axis attitude of a spacecraft in a preselected orbit, comprising:
   star sensing means on said spacecraft for sensing the positions of stars relative to said sensing means, and for producing first signals representing said star positions, said star sensing means including star trackers each having a field of vision aligned in a preselected direction and position with respect to said spacecraft, each of said star trackers including
   (1) acquiring means for acquiring star position information describing stars within said field of vision.
   (2) tracking means for tracking said stars within said field of vision.
   (3) a star catalog.
   (4) means for identifying said stars within said field of vision using said star position information and said star catalog, and
   (5) digitizing means for digitizing said star position information into digitized representations of the positions of said stars relative to said spacecraft and said spacecraft orbit, respectively;
   terrestrial body sensing means on said spacecraft for sensing the position of a terrestrial body relative to said spacecraft, and for producing second signals representing said terrestrial body position; and
   processing means for processing said first and second signals and for determining said 3-axis attitude of said spacecraft.

2. The system of claim 1 wherein each of said star trackers further comprises averaging the normalizing means for averaging and normalizing said digitized representations of said star positions to determine an averaged and normalized representation of said star positions relative to said spacecraft and said spacecraft orbit, respectively.

3. The system of claim 2 wherein said first signals comprise said digitized averaged and normalized representation of said star positions relative to said spacecraft and said spacecraft orbit, respectively.

4. A spacecraft attitude control system for determining the 3-axis attitude of a spacecraft in a preselected orbit, consisting essentially of:
   star sensing means on said spacecraft for sensing the positions of stars relative to said sensing means, and for producing first signals representing said star positions;
   cross-link sensing means on said spacecraft for sensing the position of a preselected RF beacon relative to said spacecraft, and for producing second signals representing said beacon position; and
   processing means for processing said first and second signals and for determining said 3-axis attitude of said spacecraft.

5. The system of claim 4 wherein said cross-link sensing means is an autotrack sensor that is an RF receiver, using an RF source.

6. The system of claim 5 wherein said RF receiver measures the position of said RF source relative to said spacecraft and said spacecraft orbit, respectively.

7. A method of determining the three axis attitude of a spacecraft in a preselected orbit, using star trackers on said spacecraft, an on-board star catalog and terrestrial sensor on said spacecraft, comprising the steps of:
   (A) measuring the position of a terrestrial body with respect to said spacecraft, using said terrestrial sensor;
   (B) generating a first set of coordinate data using said orbit, said first set of coordinate date defining the position of said terrestrial body relative to said spacecraft orbit;
   (C) measuring the positions of each of a plurality of stars with respect to said star trackers, using said star trackers;
   (D) generating a second set of coordinate data using the positions measured in step (C), said second set of coordinate data defining the positions of said stars relative to said spacecraft;
   (E) identifying each star measured in step (C), using said star trackers and said on-board star catalog, to generate a third set of coordinate data, said third set of coordinate data defining the positions of said stars relative to said spacecraft orbit; and
   (F) determining said attitude of said spacecraft using the position measured in step (A) and the first, second and third sets of coordinate data respectively generated in steps (B), (D) and (E).

8. The method of claim 7 wherein step (A) is performed by the substep of measuring the nadir of said terrestrial body.

9. The method of claim 7 wherein step (A) is performed by the substeps of measuring the azimuth and elevation of a preselected ground station having a location of known longitude and latitude on said terrestrial body.

10. The method of claim 7 wherein step (B) is performed by the substeps of generating said first set of coordinate data, using information regarding said spacecraft orbit and a fourth set of coordinate data, said fourth set of coordinate data having an almanac of the position of said terrestrial body relative to time.

11. The method of claim 7 wherein said first set of coordinate data is defined as a position vector, relative to said spacecraft orbit, having the following representation:

$$\begin{bmatrix} 0 \\ 0 \\ 1 \end{bmatrix}.$$

12. The method of claim 7 wherein step (C) is performed by acquiring and tracking said plurality of stars as said stars pass through the field of vision of said star tracker.

13. The method of claim 7 wherein step (D) is performed by transforming a fifth set of coordinate data into said second set of coordinate data, said fifth set of coordinate data defining the positions measured in step (C).

14. The method of claim 7 wherein step (E) is performed by transforming a sixth set of coordinate data into said third set of coordinate data, said sixth set of coordinate data defining the positions of said identified in step (E) relative to said terrestrial body.

15. The method of claim 7 wherein step (F) is performed by the substeps of averaging and normalizing the second set of coordinate data in step (D) to determine an averaged and normalized representation of said second set of coordinate data.

16. The method of claim 7 wherein step (F) is performed by the substeps of averaging and normalizing the third set of coordinate data in step (E) to determine an averaged and normalized representation of said third set of coordinate data.

17. The method of claim 7 wherein step (F) is performed by the substep of defining a set of spacecraft attitude variables in terms of said measurement from step (A) and said first, second and third sets of coordinate data, said attitude variables defining the roll pointing error, the pitch pointing error, and the yaw pointing error of said spacecraft, respectively.

18. The method of claim 17 wherein step (F) is performed by the substep of forming a system of equations using said set of spacecraft attitude variables, said averaged and normalized set of coordinate data in claim 16 and said averaged and normalized set of coordinate data in claim 17.

19. The method of claim 18 wherein step (F) is performed by the substep of solving said system of equations to determine a set of values for said attitude variables.

20. The method of claim 19 wherein step (F) is performed by the substep of determining said attitude of said spacecraft from said values for said attitude variables.

21. A method of determining the three axis attitude of a spacecraft in a preselected orbit, using star trackers on said spacecraft, an on-board star catalog and a terrestrial sensor on said spacecraft, comprising the steps of:

(A) measuring the position of a terrestrial body with respect to said spacecraft, using said terrestrial sensor by measuring the nadir of said terrestrial body;

(B) generating a first set of coordinate data using information regarding said spacecraft orbit and a second set of coordinate data, said second set of coordinate data having an almanac of the position of said terrestrial body relative to time, said first set of coordinate data defining the position of said terrestrial body relative to said spacecraft orbit;

(C) measuring the positions of each of a plurality of stars with respect to said star trackers, using said star trackers by acquiring and tracking said plurality of stars as said stars pass through the field of vision of said star trackers;

(D) generating a third set of coordinate data using the positions measured in step (C) by transforming a fourth set of coordinate data into said third set of coordinate data, said fourth set of coordinate data defining the positions measured in step (C), said third set of coordinate data defining the positions of said stars relative to said spacecraft;

(E) identifying each star measured in step (C), using said star tracker and said on-board star catalog by tracking said stars and comparing tracking information to information contained in said star catalog;

(F) generating a fifth set of coordinate data using the identification of each star from (E), said fifth set of coordinate data defining the positions of said stars relative to said spacecraft orbit;

(G) averaging and normalizing the third set of coordinate data in step (D) to determine a single averaged and normalized representation of said third set of coordinate data;

(H) averaging and normalizing the fifth set of coordinate data in step (F) to determine a single average and normalized representation of said fifth set of coordinate data;

(I) defining a set of spacecraft attitude variables in terms of said measurement from step (A) and said first, third and fifth sets of coordinate data, said attitude variables defining the roll pointing error, the pitch pointing error, and the yaw pointing error of said spacecraft, respectively;

(J) forming a system of equations using said set of spacecraft attitude variables and said averaged and normalized representations of said third and fifth sets of coordinate data in steps (G) and (H), respectively;

(K) determining a set of value data for said attitude variables by solving the system of equations in step (J); and (L) determining said attitude of said spacecraft from the set of value data in step (K).

22. The method of claim 21 wherein step (D) is performed by the substeps of transforming said fourth set of coordinate data into said third set of coordinate data by using a first direction cosine transformation matrix, said first transformation matrix having the following notation:

$$M_j = \begin{bmatrix} \cos\gamma_{R,j} & \sin\gamma_{R,j} & 0 \\ -\sin\gamma_{R,j} & \cos\gamma_{R,j} & 0 \\ 0 & 0 & 1 \end{bmatrix} \begin{bmatrix} 1 & 0 & 0 \\ 0 & \cos\epsilon_{EL,j} & \sin\epsilon_{EL,j} \\ 0 & -\sin\epsilon_{EL,j} & \cos\epsilon_{EL,j} \end{bmatrix} \begin{bmatrix} \cos\alpha_{AZ,j} & 0 & -\sin\alpha_{AZ,j} \\ 0 & 1 & 0 \\ \sin\alpha_{AZ,j} & 0 & \cos\alpha_{AZ,j} \end{bmatrix}$$

where
j = 1, ..., n (where n = the number of star trackers),
$\alpha_{AZ,j}$ = the azimuth mounting angle,
$\epsilon_{EL,j}$ = the elevation mounting angle, and
$\delta_{R,j}$ = the rotation mounting angle of said star tracker relative to said spacecraft.

23. The method of claim 21 wherein step (F) is performed by the substeps of transforming a sixth set of coordinate data into said fifth set of coordinate data using a second direction cosine transformation matrix, said sixth set of coordinate data defining the positions of said stars identified in step (E) relative to said terrestrial body, said second transformation matrix having the following notation:

$$C = \begin{bmatrix} -\sin(\Omega)\cos(\iota)\sin(\theta_2) + \cos(\Omega)\cos(\theta_2) & \sin(\theta_2)\cos(\Omega)\cos(\iota) + \sin(\Omega)\cos(\theta_2) & \sin(\iota)\sin(\theta_2) \\ -\sin(\Omega)\cos(\iota)\cos(\theta_2) - \cos(\Omega)\sin(\theta_2) & \cos(\Omega)\cos(\iota)\cos(\theta_2) - \sin(\theta_2) & \sin(\iota)\cos(\theta_2) \\ \sin(\Omega)\sin(\iota) & -\cos(\Omega)\sin(\iota) & \cos(\iota) \end{bmatrix}$$

where
$i$ = the orbit inclination,
$\Omega$ = the right ascension of the ascending node, and
$\theta_2$ = the angle proportional to the time of day.

24. The method of claim 21 wherein step (G) is performed by the substeps of averaging and normalizing said third set of coordinate data to determine an averaged and normalized representation of said third set of coordinate data, using the equation:

$$S^m_{avg,j} = \frac{S^m_{1j} + S^m_{2j} + \ldots + S^m_{kj}}{\| S^m_{1j} + S^m_{2j} + \ldots + S^m_{kj} \|_2}$$
$$j = 1, \ldots, n$$

where
$j$ = the number of star trackers;
$k$ = the number of stars measured and identified by each star tracker;
$s_{avg,j}$ = said averaged and normalized representation of said third set of coordinate data; and
$s_{k,j}$ = the measurement of each said star, respectively.

25. The method of claim 21 wherein step (H) is performed by the substeps of averaging and normalizing said fifth set of coordinate data to determine an averaged and normalized representation of said fifth set of coordinate data, using the equation:

$$r^c_{avg,j} = \frac{r^c_{1j} + r^c_{2j} + \ldots + r^c_{kj}}{\| r^c_{1j} + r^c_{2j} + \ldots + r^c_{kj} \|_2}$$
$$j = 1, \ldots, n$$

where
$j$ = the number of said star trackers;
$k$ = the number of stars measured and identified by each star tracker;
$r_{avg,j}$ = said averaged and normalized representation of said fifth set of coordinate data; and
$r_{k,j}$ = said position of each said star relative to said spacecraft orbit.

26. The method of claim 21 wherein step (I) is performed by the substeps of defining a set of spacecraft attitude variables in terms of said measurement from step (A) and said first, third and fifth sets of coordinate data, said attitude variables defining arguments in a third direction cosine transformation matrix, said third transformation matrix being a transformation from coordinates relative to said spacecraft orbit to coordinates relative to said spacecraft and having the following notation:

$$A = \begin{bmatrix} 1 & \psi & -\theta \\ -\psi & 1 & \phi \\ \theta & -\phi & 1 \end{bmatrix}$$

where
$\phi$ = the roll pointing error;
$\theta$ = the pitch pointing error, and
$\Psi$ = the yaw pointing error of said spacecraft, respectively.

27. The method of claim 26 wherein step (J) is performed by the substeps of forming a system of linear equations using said third matrix and said averaged and normalized representations of said third and fifth sets of coordinate data in steps (G) and (H), respectively.

28. The method of claim 27 wherein step (K) is performed by the substeps of determining a set of value data for said attitude variables by solving the system of linear equations in step (J) using least squares approximation.

29. A system for determining the 3-axis attitude of a spacecraft in a preselected orbit, comprising:
 star sensing means on said spacecraft for sensing the position of stars relative to said sensing means, and for producing first signals representing said star positions;
 earth sensing means on said spacecraft for sensing the position of the earth relative to said spacecraft, and for producing second signals representing said earth position, said earth sensing including a carbon dioxide band sensor for measuring the position of said earth relative to said spacecraft by measuring the nadir of the earth, said earth sensing producing said first signals, said first signals being digitized representations of said earth position relative to said spacecraft and said spacecraft orbit, respectively; and,
 processing means for processing said first and second signals and for determining said 3-axis attitude of said spacecraft.

30. A system for determining the 3-axis attitude of a spacecraft in a preselected orbit, comprising:
 star sensing means on said spacecraft for sensing the position of said stars relative to said sensing means, and for producing first signals representing said star positions; and
 earth sensing means on said spacecraft for sensing the position of the earth relative to said spacecraft, and for producing second signals representing said earth position, said earth sensing means comprising RF ground beacon sensor for measuring the position of the earth relative to said spacecraft measuring the azimuth and elevation of a preselected ground station having known longitude and latitude location values on said earth, said earth sensing means producing said first signals that are digitized representations of said earth position relative to said spacecraft and said spacecraft orbit, respectively.

31. A system for determining the 3-axis attitude of a spacecraft in a preselected orbit, comprising:

star sensing means on said spacecraft for sensing the positions of stars relative to said sensing means, and for producing first signals representing said star positions;

terrestrial body sensing means on said spacecraft for sensing the position of a terrestrial body relative to said spacecraft, and for producing said second signals representing said terrestrial body position; and, processing means for processing said first and second signals for determining said 3-axis attitude of said spacecraft, said processing means including (1) collecting and averaging means for collecting and averaging said first and second signals, and, (2) estimating means for estimating a set of attitude variables using the least squares approximations of said attitude variables, said attitude variables defining said 3-axis attitude of said spacecraft.

* * * * *